United States Patent
James et al.

(10) Patent No.: US 9,008,326 B2
(45) Date of Patent: Apr. 14, 2015

(54) METHOD FOR TESTING ECHO CANCELLERS

(71) Applicant: AT&T Intellectual Property I, L.P., Bedminster, NJ (US)

(72) Inventors: James H. James, Farmingdale, NJ (US); Wallace F. Smith, Jr., Sea Girt, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 367 days.

(21) Appl. No.: 13/651,552

(22) Filed: Oct. 15, 2012

(65) Prior Publication Data

US 2013/0039502 A1 Feb. 14, 2013

Related U.S. Application Data

(63) Continuation of application No. 12/316,695, filed on Dec. 15, 2008, now Pat. No. 8,295,501.

(51) Int. Cl.
   H04B 3/20 (2006.01)
   H04B 3/23 (2006.01)
   H04B 3/46 (2006.01)

(52) U.S. Cl.
   CPC . *H04B 3/23* (2013.01); *H04B 3/468* (2013.01)

(58) Field of Classification Search
   USPC ........................ 381/66, 94; 379/410, 411, 406
   See application file for complete search history.

(56) References Cited

PUBLICATIONS

International Telecommunications Union Recommendation G.168, "Digital Network Echo Cancellers," Apr. 2000.

*Primary Examiner* — Mark A Laurenzi
(74) *Attorney, Agent, or Firm* — Scott P. Zimmerman, PLLC

(57) ABSTRACT

The performance of an echo canceller is assessed using a) a test signal launched from originating test equipment and b) a simulated echo of the test signal launched from terminating test equipment. The launch of the simulated echo signal is timed in such a way that it arrives at the tandem echo canceller(s) at a particular point in time relative to the arrival of the test signal, at the tandem echo canceller(s), when the tandem echo canceller(s) is (are) not able to cancel the simulated echo signal. The latter thus arrives uncanceled at the target echo canceller. The launch of the simulated echo signal is further timed in such a way that it arrives at the target echo canceller at a point in time relative to the arrival of the test signal, at the target echo canceller, when the target echo canceller is able to cancel the simulated echo signal. As a result, any residual echo received at the originating test equipment is a measure of the performance of the target echo canceller exclusive of the performance of the tandem echo canceller(s).

10 Claims, 2 Drawing Sheets

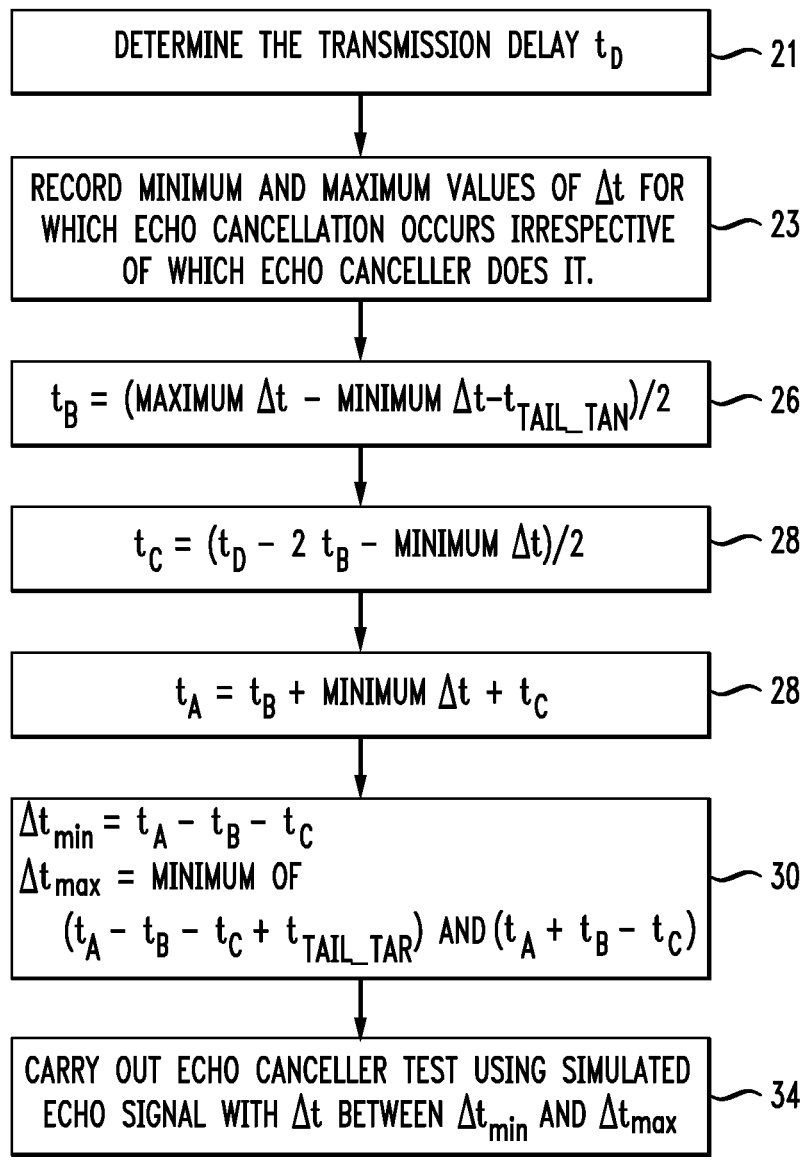

METHOD FOR TESTING ECHO CANCELLERS

CROSS-REFERENCE TO RELATED APPLICATION

This is a continuation of patent application Ser. No. 12/316,695 filed Dec. 15, 2008.

BACKGROUND

The present invention relates to the testing of echo cancellers used in, for example, telecommunications networks.

Specifically, the invention is directed toward a problem in the testing of echo cancellers used in, for example, telecommunications networks. An echo canceller is typically tested using originating test equipment that transmits a test signal to terminating testing equipment over a path that contains that echo canceller. The originating test equipment measures the residual echo. If the echo canceller is operating properly, the residual echo will be no more than some prescribed amount.

The problem arises when there is at least one additional echo canceller in the path between the originating and terminating test equipment and, additionally, the echo canceller to be tested, referred to herein as the "target" echo canceller, is not the echo canceller closest to the terminating test equipment. The source of the problem is the fact that the other echo canceller(s), referred to as the "tandem" echo canceller(s), will cancel a great deal of the echo before it reaches target echo canceller 12, making it impossible to determine whether the target echo canceller 12 is operating properly.

One possible way to solve this problem is to deploy test equipment at particular points in the field. However, such deployment is, except for the exceptional case, is financially prohibitive.

SUMMARY OF THE INVENTION

The present invention precludes such need for the special deployment of test equipment in the field.

In accordance with the invention, the performance of an echo canceller is assessed using a) a test signal launched from originating test equipment and b) a simulated echo of the test signal launched from terminating test equipment. The launch of the simulated echo signal is timed in such a way that it arrives at the tandem echo canceller(s) at a point in time relative to the arrival, at the tandem echo canceller(s), of the test signal when the tandem echo canceller(s) is (are) not able to cancel the simulated echo signal. The latter thus arrives uncanceled at the target echo canceller. The launch of the simulated echo signal is further timed in such a way that it arrives at the target echo canceller at a point in time relative to the arrival of the test signal thereat that the target echo canceller is able to cancel the simulated echo signal. Thus, as desired, any residual echo received at the originating test equipment is a measure of the performance of the target echo canceller exclusive of the performance of the tandem echo canceller(s).

BRIEF DESCRIPTION OF THE DRAWING

FIG. 2 is a flowchart of an illustrative method carried out by the test equipment of FIG. 1 to implement the principles of the invention.

DETAILED DESCRIPTION OF AN ILLUSTRATIVE EMBODIMENT

Figure 1:
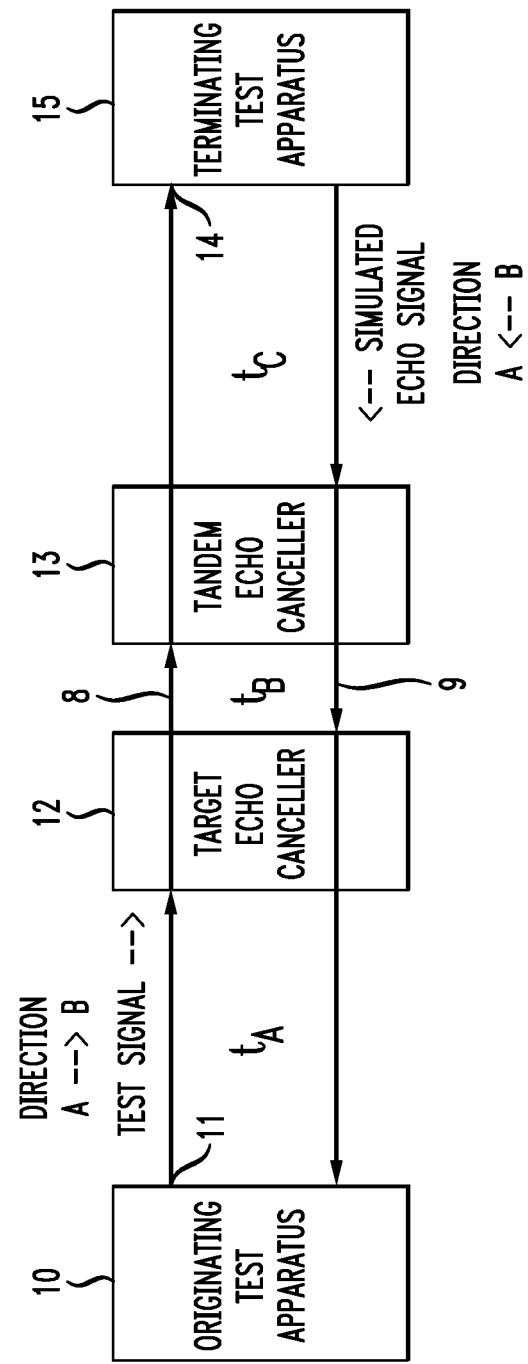
FIG. 1 shows a test connection within a telecommunications network utilizing test equipment embodying the principles of the present invention.

FIG. 1 depicts an echo canceller testing arrangement embodying the principles of the present invention.

Echo cancellers are necessary in communications networks because, for example, a portion of an outgoing signal transmitted on the outgoing portion of a four-wire line may appear as an echo superimposed on an incoming signal on the incoming portion of the four-wire line. Such echoes result from to the imperfect nature of four-wire-to-two-wire hybrids in the network and/or various discontinuities in the network. The function of an echo canceller is to cancel that echo from the incoming signal, and the object of the testing arrangement of FIG. 1 is to test the performance of echo canceller 12, which is part of the infrastructure of a telecommunications network.

In FIG. 1, an outgoing signal on a two-wire path 8 passes through echo canceller 12 in a first direction designated A→B. An incoming signal passes through echo canceller 12 in a second direction designated B→A. Echo canceller 12 adaptively learns the so-called echo channel so as to be able to use the outgoing signal to generate a replica of the expected echo of that signal. This generated "echo replica" is subtracted by the echo canceller from the incoming signal, delivering an incoming signal from which most of the echo has been removed.

It is desirable to be able to test the performance of echo canceller 12, i.e., determine whether it is, in fact, substantially removing echo from the incoming signal. To that end, centralized originating-end test apparatus 10 at an origination point 11 launches a test signal into the network through echo canceller 12 to a termination point 14. (Test apparatus 10 (as well as test apparatus 15 discussed below) are "centralized" test apparatus, meaning that the originating and terminating equipment are co-located. This allows test calls to be made through any network of interest that is capable of routing the call back to the originating location. In addition, the use of centralized test apparatus allows the test signal and the echo signal to be properly synchronized, as described below. An echo of the test signal is transmitted back toward the originating test equipment along path 9 in a manner to be described. Any echo that is not cancelled is so-called residual echo, which is received by test apparatus 10. By measuring the signal level of the residual echo, test apparatus 10 can determine the performance level of echo canceller 12, i.e., whether it is operating "to specs" or not.

The signal path from test apparatus 10 to termination point 14 may include one or more other echo cancellers, referred to as "tandem" echo cancellers. In this example there is only one tandem echo canceller 13. The presence of the tandem echo canceller creates a problem in terms of being able to measure the performance of echo canceller 12 because, if nothing else were to be done, the echo reflected back from termination point 14 will, to at least some extent, be cancelled by echo canceller 13, compromising the ability to assess the performance of echo canceller 12, which is the echo canceller desired to be tested.

In accordance with the invention, the above problem is solved by measuring the performance of echo canceller 12 using a simulated echo signal launched by centralized terminating test apparatus 15 connected at terminating point 14 and transmitted back toward originating test apparatus 10. The simulated echo signal is an attenuated replica of the test signal, just as would be a real echo generated at a hybrid or other network discontinuity. The time at which the simulated echo signal is transmitted from terminating test apparatus 15 is chosen such that only the target echo canceller cancels any significant portion of the simulated echo, even if there is a tandem echo canceller connected in the path.

In the disclosed embodiment, for example, the simulated echo signal is launched at such a time relative to the launching of the test signal that the simulated echo signal arrives at a tandem echo canceller connected in the path too early relative to the arrival of the test signal at the tandem echo canceller for the tandem echo canceller to be able to cancel any significant portion of the simulated echo. In order to generate an echo replica, an echo canceller must have already begun to receive the signal whose echo is to be cancelled, as already noted. Echo canceller 13 is thus not able to generate a replica of the simulated echo signal and therefore cannot cancel it. The simulated echo signal is not recognized as echo by echo canceller 13 and therefore passes substantially unchanged to echo canceller 12.

The chosen time for the transmittal of the simulated echo signal from terminating test apparatus 15 must also meet another criterion. It must be timed relative to the arrival of the outgoing test signal at echo canceller 12 so that the latter is able to generate the echo replica and thereby cancel the simulated echo signal. The extent to which a residual echo signal reaches originating test apparatus 10 is indicative of the performance of echo canceller 12, as desired.

The key calculation, then, is to determine when the simulated echo signal should be transmitted. Let us define three signal transmission times, $t_A$ seconds, $t_B$ seconds, and $t_C$ seconds, and two echo canceller tail coverages, $t_{TAIL\_TAR}$ seconds and $t_{TAIL\_TAN}$ seconds, as follows:

| | |
|---|---|
| $t_A$ | signal transmission time from originating test apparatus 10 to target echo canceller 12 |
| $t_B$ | signal transmission time from target echo canceller 12 to tandem echo canceller 13 |
| $t_C$ | signal transmission time from tandem echo canceller 13 to terminating test apparatus 15 |
| $t_{TAIL\_TAR}$ | tail coverage of the target echo canceller |
| $t_{TAIL\_TAN}$ | tail coverage of the tandem echo canceller |

(The tail coverage of an echo canceller is the maximum amount of delay that can occur between the arrival of a signal at the echo canceller and the arrival of its echo and yet still have the echo canceller cancel the echo.)

Let us also define a delay time $\Delta t$ seconds, which is the amount of time that transmission by terminating test apparatus 15 of the simulated echo signal is delayed relative to transmission of the test signal by originating test apparatus 10.

Given these definitions, it can be observed that target echo canceller 12 will cancel echo for values of $\Delta t$ between ($t_A-t_B-t_C$) and ($t_A-t_B-t_C+t_{TAIL\_TAR}$). This range of values of $\Delta t$ corresponds to echo path delays (EPDs) between 0 and the echo canceller tail delay coverage for target echo canceller 12. The above statement about the range of values of $\Delta t$ that allow echo canceller 12 to cancel the simulated echo signal can be appreciated by considering the fact that the simulated echo signal requires the time ($t_B+t_C$) to travel from terminating test apparatus 15 and echo canceller 12. Thus launching the simulated echo signal between ($t_A-t_B-t_C$) and ($t_A-t_B-t_C+t_{TAIL\_TAR}$) after the test signal is launched from originating test apparatus 10 means that the simulated echo of the test signal will arrive at echo canceller 12 at the same time as the test signal, or sufficiently shortly thereafter, to allow echo canceller 12 to, in fact, cancel the simulated echo signal.

Note that, depending on the values of $t_A$, $t_B$, and $t_C$, the quantities ($t_A-t_B-t_C$) and ($t_A-t_B-t_C+t_{TAIL\_TAR}$) might be negative, in which case the simulated echo signal would be launched before the test signal, rather than after.

It can be similarly observed relative to tandem echo canceller 13 that that echo canceller will cancel echo for values of $\Delta t$ between ($t_A+t_B-t_C$) and ($t_A+t_B-t_C+t_{TAIL\_TAN}$). This corresponds to echo path delays (EPDs) between 0 and the echo canceller tail delay coverage for tandem echo canceller 13.

In view of the foregoing, it will be appreciated that the minimum value of $\Delta t$ for which only target echo canceller 12 will cancel echo, herein denoted $\Delta t_{min}$, is, as described above, $t_A-t_B-t_C$. This is so because if the launch of the simulated echo signal is delayed less than $\Delta t_{min}$ relative to the launch of the test signal, the simulated echo signal will arrive at tandem echo canceller 13 too soon for the latter to generate a replica from the test signal.

Moreover, the maximum value of $\Delta t$ for which only target echo canceller 12 will cancel echo, herein denoted $\Delta t_{max}$, is the smaller of a) the maximum value of $\Delta t$ at which target echo canceller 12 will cancel echo and b) the minimum value of $\Delta t$ at which tandem echo canceller 13 will cancel echo, these being, respectively, the smaller of a) ($t_A-t_B-t_C+t_{TAIL\_TAR}$) and b) ($t_A+t_B-t_C$). This is so because the tandem echo canceller may begin to operate (cancel echo) before the reaching the maximum value of $\Delta t$ at which target echo canceller 12 will cancel echo. The tandem echo canceller will begin to operate at a value of $\Delta t = t_A+t_B-t_C$.

In summary, then, $\Delta t$ should be at least $$\Delta t_{min} = t_A - t_B - t_C$$

and $\Delta t$ should be no more than $\Delta t_{max}$ = minimum of ($t_A-t_B-t_C+t_{TAIL\_TAR}$) and ($t_A+t_B-t_C$)

Thus in order to perform echo cancellation tests on target echo canceller 12, we use a value of $\Delta t$ within the range $\Delta t_{min}$ to $\Delta t_{max}$. This ensures that 1) target echo canceller 12 is the only canceling echo canceller in the connection when the measurements are being made, and 2) the echo path delay as seen by target echo canceller 12 is within its tail coverage capability.

Note that although the simulated echo signal is generated by terminating test apparatus 15, the delay $\Delta t$ in launching that signal is a (positive or negative) delay relative to the launch of the test signal by originating test apparatus 10. Thus terminating test apparatus 15 needs to be aware of when originating test apparatus 10 launches the test signal. This is readily accomplished by, for example, using standard synchronization techniques and/or by having apparatus 10 and 15 operate off of a common clock, e.g., a master clock of the network in which the echo canceller 12 is tested.

Measuring the Parameters

Knowing the above values of the minimum and maximum values of $\Delta t$ require that we know the values of $t_A$, $t_B$, and $t_C$, as well as the target and tandem echo canceller tail coverage capabilities. The latter are known, leaving only the task of determining the values of $t_A$, $t_B$, and $t_C$. Those values can, in fact, be determined by having the originating and terminating test apparatus 10 and 15—which are able to communicate directly with one another through the network—make certain measurements, as follows:

1. Determine the transmission delay $t_D$ between the originating and terminating test apparatus 10 and 15 using standard techniques, as indicated at 21 in FIG. 2.

2. As indicated at 23 in FIG. 2, perform a series of tests in which $\Delta t$ is swept from 0 to a value equal to $(t_D + t_{TAIL\_TAN})$. For each value of $\Delta t$, the residual echo is recorded at the originating end to determine if echo cancellation has occurred. Record the minimum (denoted "minimum $\Delta t$") and maximum (denoted "maximum $\Delta t$") values of $\Delta t$ for which echo cancellation occurs. These tests and measurements are made without regard to which echo canceller, or both, are carrying out the echo cancellation—something that it not even known at this point. It is assumed in the illustrative embodiment that target echo canceller 12 is closer (in terms of transmission delay) to the terminating end of the connection than to the originating end, in which case $t_A - t_B - t_C$ will be positive. This is why it is sufficient for $\Delta t$ to be swept upwards from 0. However, one could take into account the possibility of echo canceller 12 being closer to the originating end than the terminating end by sweeping $\Delta t$ upward from an appropriate negative value. The values of $t_A$, $t_B$, and $t_C$ are then determined based on the following considerations:

We have already seen that the minimum $\Delta t$ for which echo cancellation occurs by either the target 12 or tandem 13 cancellers corresponds to $t_A - t_B - t_C$, and the maximum $\Delta t$ for which echo cancellation occurs corresponds to $t_A + t_B - t_C + t_{TAIL\_TAN}$. Rearranging these two relationships yields $$t_A - t_C = t_B + \text{minimum}\Delta t, \text{ and}$$

$$t_A - t_C = -t_B + \text{maximum}\Delta t - t_{TAIL\_TAN}$$

Thus, $$t_B + \text{minimum}\Delta t = -t_B + \text{maximum}\Delta t - t_{TAIL\_TAN}$$

And thus, as indicated at 26 in FIG. 2, we can determine $t_B$ based on known and measured quantities as being $$t_B = (\text{maximum}\Delta t - \text{minimum}\Delta t - t_{TAIL\_TAN})/2$$

The transmission delay between the originating and terminating centralized test apparatus $(t_D)$ is equal to $t_A + t_B + t_C$ assuming negligible delay through the target and tandem echo cancellers. Thus $$t_A = t_D - t_B - t_C$$

and it was previously demonstrated that $$t_A = t_B + \text{minimum}\Delta t + t_C$$

Thus $$t_D - t_B - t_C = t_B + \text{minimum}\Delta t + t_C$$

Thus, as indicated at 28 in FIG. 2, we can determine $t_C$ based on known, measured and computed quantities as being $$t_C = (t_D - 2t_B - \text{minimum}\Delta t)/2$$

And, as indicated at 30 in FIG. 2, we can determine $t_A$ based on known, measured and computed quantities, it having been previously demonstrated that $$t_A = t_B + \text{minimum}\Delta t + t_C$$

Once the values of $t_A$, $t_B$, and $t_C$ have been thus determined, the valid range of $\Delta t$ for which only target echo canceller 12 will cancel echo—namely the range $\Delta t_{min}$ to $\Delta t_{max}$—can be calculated, as indicated at 33 in FIG. 2, and echo canceller 12 can be tested, as indicated at 34.

Configuration of the Test Apparatus 10 and 15

Originating and terminating test apparatus 10 and 15 may be implemented as processor-based equipment that operate under the control of programming (software, firmware, etc.) to carry out the steps of the method as shown in FIG. 2. Given the description herein of steps that can be carried out to implement the invention, those skilled in the design of communications testing equipment will be readily able to design such equipment, including the creation of the relevant programming.

Thus, for example, the combination of the processor and particular portions of the programming at terminating test apparatus 15 would comprise a means for determining when the test signal is launched and a combination of the processor and particular other portions of the programming would comprise a means for launching the simulated echo signal $\Delta t$ seconds after the launching of the test signal. The present illustrative embodiment comprises a test set that includes both the originating and terminating test apparatus. Another approach would be to have a master apparatus that instructs the originating and terminating apparatus when to play the test signals and begin recording echo.

The disclosed test apparatus can be used in different ways for different purposes. If the goal is to collect statistics about a network generally, it is not necessary to know which particular target echo cancellers one is testing. One could simply launch an appropriately large number of test calls through the network and allow the network to route those calls in the normal way. If the number of calls is large enough (as determined by the size of the network, number of echo cancellers deployed, etc.) statistics about which of the test calls evidenced echo canceller problems could be taken as indicative of the level of performance of the network's echo canceller plant in the aggregate. This kind of test environment may advantageously use the centralized approach described herein.

Alternatively, the originating and terminating test apparatus could be deployed within the network infrastructure and arranged to test the performance of an individual selected echo cancellers deployed in a particular trunk. The goal here might be to identify particular echo cancellers that are not performing properly so that they can be serviced or replaced. In such a test environment the originating and terminating test apparatus could be deployed at different locations within the network and tied to a master clock or otherwise appropriately synchronized so that the simulated echo signal could be launched with a desired $\Delta t$.

The term "delay" as used herein includes negative delays. Specifically, a negative value of the delay $\Delta t$ means that the launch of the simulated echo signal will occur before the launch of the test signal. Thus a statement that the launching of the simulated echo signal is $\Delta t$ seconds after the launching of the test signal means that the simulated echo signal is launched before the launching of the test signal when $\Delta t$ has a negative value.

The foregoing merely illustrates the principles of the invention. Those skilled in the art will be able to devise various alternative arrangements and steps that, although not explicitly shown or described herein, embody the principles of the invention and thus are within its spirit and scope.

The invention claimed is:

1. Processor-based equipment adapted to operate under the control of programming to test a target echo canceller connected between origination and termination points of a communications path, the processor-based equipment comprising
   at least one processor, and
   at least one medium on which is stored programming that, when executed by the at least one processor, causes the processor-based equipment to
   launch a test signal over the path from the origination point, and launch a simulated echo signal over the path from the termination point, the simulated echo signal containing a simulated echo of the test signal, and the simulated echo signal being launched at such a time relative to the launching of the test signal that only the target echo canceller cancels any significant portion of the simulated echo, even if there is a tandem echo canceller connected in the path.

2. The processor-based equipment of claim 1 wherein the stored programming, when executed by the at least one processor, further causes the processor-based equipment to determine the performance of the target echo canceller in response to a residual of the simulated echo signal received at the origination point.

3. The processor-based equipment of claim 1 wherein the stored programming causes the simulated echo signal to be launched at such a time relative to the launching of the test signal that the simulated echo signal arrives at a tandem echo canceller connected in the path too early relative to the arrival of the test signal at the tandem echo canceller for the tandem echo canceller to be able to cancel any significant portion of the simulated echo.

4. The processor-based equipment of claim 1 wherein the stored programming causes the simulated echo signal to be launched $\Delta t$ seconds after the launch of the test signal, where the value of $\Delta t$ is at least $\Delta t_{min} = t_A - t_B - t_C$, where $t_A$=time required for the transmission of signals from the origination point to the target echo canceller, $t_B$=time required for the transmission of signals from the target echo canceller to the tandem echo canceller, and $t_C$=time required for the transmission of signals from the tandem echo canceller to the termination point.

5. The processor-based equipment of claim 1 wherein the stored programming causes the simulated echo signal to be launched $\Delta t$ seconds after the launch of the test signal, where the value of $\Delta t$ is no more than $\Delta t_{max}$=the smaller of a) $(t_A - t_B - t_C + t_{TAIL\_TAR})$ and b) $(t_A + t_B - t_C)$, where $t_A$=time required for the transmission of signals from the origination point to the target echo canceller, $t_B$=time required for the transmission of signals from the target echo canceller to the tandem echo canceller, $t_C$=time required for the transmission of signals from the tandem echo canceller to the termination point, and $t_{TAIL\_TAR}$ is the tail coverage of the target echo canceller.

6. The processor-based equipment of claim 5 wherein the stored programming causes the simulated echo signal to be launched $\Delta t$ seconds after the launch of the test signal, where the value of $\Delta t$ is no more than $\Delta t_{max}$=the smaller of a) $(t_A - t_B - t_C + t_{TAIL\_TAR})$ and b) $(t_A + t_B - t_C)$, where $t_A$=time required for the transmission of signals from the origination point to the target echo canceller, $t_B$=time required for the transmission of signals from the target echo canceller to the tandem echo canceller, $t_C$=time required for the transmission of signals from the tandem echo canceller to the termination point, and $t_{TAIL\_TAR}$ is the tail coverage of the target echo canceller.

7. Apparatus for use in testing a target echo canceller connected between origination and termination points of a communications path, the apparatus comprising
    means for determining when a test signal is launched over the path from the origination point, and
    means for launching from the termination point a signal that contains a simulated echo of the test signal, the launching of the simulated echo signal being $\Delta t$ seconds after the launching of the test signal,
    the value of $\Delta t$ being such that only the target echo canceller cancels any significant portion of the simulated echo, even if there is a tandem echo canceller connected in the path.

8. The apparatus of claim 7 wherein the value of $\Delta t$ is such that a simulated echo signal is launched at such a time relative to the launching of the test signal that the simulated echo signal arrives at a tandem echo canceller connected in the path too early relative to the arrival of the test signal at the tandem echo canceller for the tandem echo canceller to be able to cancel any significant portion of the simulated echo.

9. The apparatus of claim 8 wherein the value of $\Delta t$ is at least $\Delta t_{min} = t_A - t_B - t_C$, where $t_A$=time required for the transmission of signals from the origination point to the target echo canceller, $t_B$=time required for the transmission of signals from the target echo canceller to the tandem echo canceller, and $t_C$=time required for the transmission of signals from the tandem echo canceller to the termination point.

10. The apparatus of claim 8 wherein the simulated echo signal is launched $\Delta t$ seconds after the launch of the test signal, where $\Delta t$ is no more than $\Delta t_{max}$=the smaller of a) $(t_A - t_B - t_C + t_{TAIL\_TAR})$ and b) $(t_A + t_B - t_C)$, where $t_A$=time required for the transmission of signals from the origination point to the target echo canceller, $t_B$=time required for the transmission of signals from the target echo canceller to the tandem echo canceller, $t_C$=time required for the transmission of signals from the tandem echo canceller to the termination point, and $t_{TAIL\_TAR}$ is the tail coverage of the target echo canceller.

* * * * *